US012756730B2

(12) United States Patent
Xue

(10) Patent No.: US 12,756,730 B2
(45) Date of Patent: Oct. 6, 2026

(54) FLOOD ATTACK DEFENSE METHOD AND RELATED APPARATUS

(71) Applicant: HUAWEI TECHNOLOGIES CO., LTD., Shenzhen (CN)

(72) Inventor: Wan Xue, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 18/755,910

(22) Filed: Jun. 27, 2024

(65) Prior Publication Data

US 2024/0348636 A1 Oct. 17, 2024

Related U.S. Application Data

(63) Continuation of application No. PCT/CN2022/141054, filed on Dec. 22, 2022.

(30) Foreign Application Priority Data

Dec. 31, 2021 (CN) ......................... 202111675698.3

(51) Int. Cl.
*H04L 9/40* (2022.01)
*H04L 45/74* (2022.01)

(52) U.S. Cl.
CPC ........ *H04L 63/1425* (2013.01); *H04L 45/742* (2013.01); *H04L 63/1458* (2013.01)

(58) Field of Classification Search
CPC ......................... H04L 63/1425; H04L 45/742; H04L 63/1458
See application file for complete search history.

(56) References Cited

U.S. PATENT DOCUMENTS 9,860,169 B1 * 1/2018 Ninan ................... H04L 45/033
2009/0024758 A1 * 1/2009 Levy-Abegnoli ..... H04L 45/745 709/237
2014/0215047 A1 * 7/2014 Li ....................... H04L 49/9084 709/223
2015/0058989 A1 * 2/2015 Lahti ................... H04L 63/1416 726/23

(Continued)

FOREIGN PATENT DOCUMENTS

CN 103036794 A 4/2013
CN 103139071 A 6/2013

(Continued)

OTHER PUBLICATIONS

International Search Report issued in corresponding International Application No. PCT/CN2022/141054, dated Mar. 10, 2023, pp. 1-30.

(Continued)

*Primary Examiner* — Stephen T Gundry
(74) *Attorney, Agent, or Firm* — HAUPTMAN HAM, LLP

(57) ABSTRACT

A flood attack defense method and a related apparatus. A first node receives a first packet from a second node. The first packet includes a source IPv6 address of a data packet, and the source IPv6 address of the data packet is a next-hop address in a routing table or a forwarding table of the first node. The first node establishes a first neighbor cache entry. A destination IPv6 address included in the first neighbor cache entry is the source IPv6 address of the data packet.

16 Claims, 3 Drawing Sheets

(56) References Cited

U.S. PATENT DOCUMENTS

| | | | | |
|---|---|---|---|---|
| 2016/0112315 | A1* | 4/2016 | Tosaka | H04L 45/54 370/392 |
| 2017/0339048 | A1* | 11/2017 | Thomas | H04L 45/745 |
| 2021/0377168 | A1* | 12/2021 | Xie | H04L 45/16 |
| 2022/0104100 | A1* | 3/2022 | M | H04W 40/02 |
| 2022/0109623 | A1* | 4/2022 | Xie | H04L 45/745 |
| 2022/0131808 | A1* | 4/2022 | Xie | H04L 45/02 |
| 2022/0141127 | A1* | 5/2022 | Li | H04L 12/4641 370/216 |
| 2022/0166661 | A1* | 5/2022 | Dutta | H04L 41/0654 |
| 2022/0200820 | A1* | 6/2022 | Xie | H04L 12/4633 |
| 2022/0224626 | A1* | 7/2022 | Adiga H R | H04L 45/66 |
| 2022/0224633 | A1* | 7/2022 | Xie | H04L 45/03 |
| 2022/0231942 | A1* | 7/2022 | Hao | H04L 45/745 |
| 2022/0239590 | A1* | 7/2022 | Xie | H04L 45/04 |
| 2022/0263753 | A1* | 8/2022 | Zhang | H04L 45/50 |
| 2022/0263758 | A1* | 8/2022 | Zhang | H04L 12/12 |
| 2022/0263760 | A1* | 8/2022 | Tian | H04L 45/54 |
| 2022/0286381 | A1* | 9/2022 | Xue | H04L 45/566 |
| 2022/0385560 | A1* | 12/2022 | Dutta | H04L 45/26 |
| 2022/0407736 | A1* | 12/2022 | Wijnands | H04L 12/1886 |
| 2022/0417140 | A1* | 12/2022 | Mendes | H04L 45/44 |
| 2023/0146104 | A1* | 5/2023 | Wang | H04L 63/1466 |
| 2023/0155932 | A1* | 5/2023 | Zhang | H04L 45/34 709/238 |
| 2023/0179564 | A1* | 6/2023 | Boutros | H04L 61/5007 370/392 |
| 2023/0283554 | A1* | 9/2023 | Geng | H04L 45/74 370/389 |
| 2023/0318966 | A1* | 10/2023 | Duan | H04L 12/4633 370/392 |
| 2023/0318974 | A1* | 10/2023 | Xie | H04L 45/741 370/392 |
| 2024/0045801 | A1* | 2/2024 | Thomas | H04L 12/4641 |
| 2024/0275722 | A1* | 8/2024 | Xie | H04L 45/34 |
| 2024/0314071 | A1* | 9/2024 | Wu | H04L 45/03 |
| 2024/0340239 | A1* | 10/2024 | Zhu | H04L 45/741 |

FOREIGN PATENT DOCUMENTS

| | | |
|---|---|---|
| CN | 106789662 A | 5/2017 |
| CN | 113037879 A | 6/2021 |
| CN | 114465776 A | 5/2022 |

OTHER PUBLICATIONS

Chinese Office Action issued in corresponding Chinese Application No. 202111675698.3, dated Sep. 14, 2022, pp. 1-11.

Extended European Search Report issued in corresponding European Application No. 22914493.6, dated Feb. 13, 2025, pp. 1-9.

* cited by examiner

FLOOD ATTACK DEFENSE METHOD AND RELATED APPARATUS

CROSS-REFERENCE TO RELATED APPLICATIONS

This application is a continuation of International Application No. PCT/CN2022/141054, filed on Dec. 22, 2022, which claims priority to Chinese Patent Application No. 202111675698.3, filed on Dec. 31, 2021. The disclosures of the aforementioned applications are hereby incorporated by reference in their entireties.

TECHNICAL FIELD

This application relates to the field of communication technologies, and in particular, to a flood attack defense method and a related apparatus.

BACKGROUND

Currently, in internet protocol version 6 (IPv6), neighbor discovery (ND) uses a neighbor solicitation (NS) packet that is learned. This is because a node feeds back a neighbor advertisement (NA) packet after receiving the NS packet. Before feeding back the NA packet, the node establishes a neighbor cache entry based on the NS packet. In this way, the node may obtain a destination IPv6 address from the neighbor cache entry, and may correctly feed back the NA packet based on the destination IPv6 address. Because a quantity of neighbor cache entries is limited, a new neighbor cache entry may overwrite an old neighbor cache entry. Especially in response to being subject to a packet flood attack, the node establishes a large quantity of neighbor cache entries. As a result, neighbor cache entries used by some services are overwritten by neighbor cache entries of an attack packet, and the node cannot obtain the neighbor cache entries of these services, causing service interruption.

SUMMARY

Embodiments described herein provide a flood attack defense method and a related apparatus, to avoid service interruption.

According to a first aspect, a flood attack defense method is provided. The method includes: A first node receives a first packet from a second node. The first packet includes a source IPv6 address of a data packet, and the source IPv6 address of the data packet is a next-hop address in a routing table or a forwarding table of the first node. The first node establishes a first neighbor cache entry. A destination IPv6 address included in the first neighbor cache entry is the source IPv6 address of the data packet. In other words, the second node may send the first packet to the first node, and the source IPv6 address of the data packet that is included in the first packet is the next-hop address in the routing table or the forwarding table of the first node. Therefore, the first node may establish an entry corresponding to the first packet. In this case, in a flood attack scenario, in response to the source IPv6 address of the data packet in the first packet being the next-hop address in the routing table or the forwarding table of the first node, the first node may still establish the first neighbor cache entry. In this way, the first neighbor cache entry can be stored, and the first node can learn the neighbor cache entry and perform service forwarding by using learned information, to avoid service interruption.

Optionally, with reference to the first aspect, that the first node establishes a first neighbor cache entry includes: The first node preferentially overwrites a second neighbor cache entry with the first neighbor cache entry. A destination IPv6 address included in the second neighbor cache entry is not the next-hop address in the routing table or the forwarding table of the first node. In other words, the first node may preferentially overwrite the second neighbor cache entry in which a destination IPv6 address is not the next-hop address in the routing table or the forwarding table of the first node with the first neighbor cache entry. In this way, the first neighbor cache entry can be stored in the flood attack scenario, and the first node can learn the neighbor cache entry and perform service forwarding by using the learned information, to avoid the service interruption.

Optionally, with reference to the first aspect, a first area that is in the first node and that stores a neighbor cache entry is fully occupied. The first area is a neighbor cache table. The neighbor cache entry in the first area includes a destination IPv6 address. The second neighbor cache entry is included in the first area. That the first node preferentially overwrites a second neighbor cache entry with the first neighbor cache entry includes: The first node changes the second neighbor cache entry to the first neighbor cache entry. In other words, in the flood attack scenario, in response to the first area being fully occupied, the first node changes the second neighbor cache entry in which the destination IPv6 address is not the next-hop address in the routing table or the forwarding table of the first node to the first neighbor cache entry. In this way, the first neighbor cache entry can be stored, and the first node can learn the neighbor cache entry and perform service forwarding by using the learned information, to avoid the service interruption.

Optionally, with reference to the first aspect, the neighbor cache entry in the first area further includes aging time, and the second neighbor cache entry is a neighbor cache entry in which aging time is the shortest in the first area. In other words, in the flood attack scenario, in response to the first area being fully occupied, the first node changes the second neighbor cache entry in which a target IPv6 address is not the next-hop address in the routing table or the forwarding table of the first node and in which aging time is the shortest to the first neighbor cache entry. In this way, the first neighbor cache entry can be stored, and the first node can learn the neighbor cache entry and perform service forwarding by using the learned information, to avoid the service interruption.

Optionally, with reference to the first aspect, a second area that is in the first node and that stores a neighbor cache entry is fully occupied. The second area is a neighbor cache table. The neighbor cache entry in the second area includes priority information and a destination IPv6 address. The second neighbor cache entry is included in the second area. That the first node preferentially overwrites a second neighbor cache entry with the first neighbor cache entry includes: The first node changes the second neighbor cache entry to the first neighbor cache entry. Priority information included in the second neighbor cache entry is lower than priority information included in a third neighbor cache entry in the second area, and a destination IPv6 address included in the third neighbor cache entry is the next-hop address in the routing table or the forwarding table of the first node. In other words, in the flood attack scenario, in response to the second area being fully occupied, the first node changes the second neighbor cache entry in which the priority information is lower than that of the third neighbor cache entry to the first neighbor cache entry. In this way, the first neighbor cache entry can be stored, and the first node can learn the neighbor cache entry and perform service forwarding by using the learned information, to avoid the service interruption.

Optionally, with reference to the first aspect, the neighbor cache entry in the second area further includes aging time, and the second neighbor cache entry is a neighbor cache entry in which aging time is the shortest in the second area. In other words, in the flood attack scenario, in response to the second area being fully occupied, the first node changes the second neighbor cache entry in which the priority information is lower than that of the third neighbor cache entry and in which aging time is the shortest to the first neighbor cache entry. In this way, the first neighbor cache entry can be stored, and the first node can learn the neighbor cache entry and perform service forwarding by using the learned information, to avoid the service interruption.

Optionally, with reference to the first aspect, areas in the first node that store a neighbor cache entry include a third area and a fourth area. The third area and the fourth area are neighbor cache tables. A destination IPv6 address included in a neighbor cache entry in the third area is the next-hop address in the routing table or the forwarding table of the first node. A destination IPv6 address included in a neighbor cache entry in the fourth area is not the next-hop address in the routing table or the forwarding table of the first node. The fourth area is fully occupied. That the first node establishes the neighbor cache entry includes: The first node establishes the first neighbor cache entry in the third area. In other words, in the flood attack scenario, in response to the fourth area being fully occupied, the first node may still establish the first neighbor cache entry in the third area. In this way, the first neighbor cache entry can be stored, and the first node can learn the neighbor cache entry and perform service forwarding by using the learned information, to avoid the service interruption.

Optionally, with reference to the first aspect, that the first node establishes the first neighbor cache entry in the third area includes: The first node determines whether a fourth neighbor cache entry exists in the third area. A MAC address included in the fourth neighbor cache entry is an invalid value, and a destination IPv6 address included in the fourth neighbor cache entry is the source IPv6 address of the data packet. In response to the fourth neighbor cache entry existing, the first node changes the fourth neighbor cache entry to the first neighbor cache entry; or in response to the fourth neighbor cache entry not existing, the first node establishes the first neighbor cache entry in the third area. In other words, in the flood attack scenario, the first node may still establish the first neighbor cache entry in the third area. In this way, the first neighbor cache entry can be stored, and the first node can learn the neighbor cache entry and perform service forwarding by using the learned information, to avoid the service interruption.

According to a second aspect, a flood attack defense method is provided. The method includes: A first node obtains a first IPv6 address corresponding to a first packet. The first node searches a first area for a media access control MAC address corresponding to the first IPv6 address. The first area is a neighbor cache table. In response to the MAC address corresponding to the first IPv6 address not being found in the first area, the first node obtains, from a second area based on identification information of a first interface, the MAC address corresponding to the first IPv6 address. The first interface is an outbound interface of the first packet. The outbound interface is an Ethernet main interface or virtual local area network VLAN sub-interface, or the outbound interface is an Eth-trunk main interface or VLAN sub-interface. The second area includes a correspondence between identification information of an interface and a MAC address. The first node sends the first packet based on the MAC address corresponding to the first IPv6 address. In other words, in response to the first node not finding, in the neighbor cache table, the MAC address corresponding to the first IPv6 address, the first node may obtain, from the second area based on the identification information of the outbound interface of the first packet, the MAC address corresponding to the first IPv6 address. In this way, the first node may send the first packet based on the MAC address corresponding to the first IPv6 address, to avoid a problem in which service interruption is caused because a MAC address cannot be learned from the neighbor cache table.

Optionally, with reference to the second aspect, the first packet includes a source IPv6 address and a destination IPv6 address. In response to the source IPv6 address and the destination IPv6 address being addresses in different network segments, the first IPv6 address is a next-hop address obtained by the first node from a routing table or a forwarding table of the first node based on the first packet. In response to the source IPv6 address and the destination IPv6 address being addresses in a same network segment, the first IPv6 address is the destination IPv6 address. In other words, whether the source IPv6 address and the destination IPv6 address are the addresses in the same network segment is determined, to determine first IPv6 addresses in different networking scenarios.

Optionally, with reference to the second aspect, before that the first node obtains, from a second area based on identification information of a first interface, the MAC address corresponding to the first IPv6 address, the method further includes: The first node obtains a route advertisement (RA) packet or a dynamic host configuration protocol (DHCP) packet from the first interface. The RA packet or the DHCP packet includes a source MAC address of a data packet. The first node establishes, in the second area, a correspondence between the identification information of the first interface and the source MAC address based on the identification information of the first interface and the source MAC address. In other words, the first node obtains the RA packet or the DHCP packet from the first interface, and the first node may establish, in the second area, the correspondence between the identification information of the first interface and the source MAC address of the data packet based on the identification information of the first interface and the source MAC address included in the RA packet or the DHCP packet. In this way, the correspondence between the identification information of the first interface and the source MAC address can be stored in a flood attack scenario, and the first node can learn the MAC address based on the correspondence between the identification information of the first interface and the source MAC address, and perform service forwarding by using the learned MAC address, to avoid service interruption.

Optionally, with reference to the second aspect, that the first node obtains an RA packet from the first interface includes: In response to an RA packet sent by one router node being received from the first interface, the first node determines the RA packet sent by the router node as the RA packet; or in response to RA packets sent by a plurality of router nodes being received from the first interface, the first node determines a high-priority RA packet in the RA packets sent by the plurality of router nodes as the RA packet. In other words, in response to the first node receiving the RA packet sent by one or more router nodes, the first node selects a corresponding RA packet in different cases, to prepare for subsequently establishing, in the second area, the correspondence between the identification information of the first interface and the source MAC address.

Optionally, with reference to the second aspect, the method further includes: The first node sends a second packet. The second packet is used to request the MAC address corresponding to the first IPv6 address. The first node receives a third packet. The third packet includes the MAC address corresponding to the first IPv6 address. That the first node obtains, from a second area based on identification information of a first interface, the MAC address corresponding to the first IPv6 address includes: In response to a neighbor cache entry not being able to be established in the first area based on the third packet, the first node determines, from the second area, identification information that is of a target interface and that matches the identification information of the first interface. The first node obtains, based on the correspondence included in the second area, a MAC address corresponding to the identification information of the target interface, and uses the address as the MAC address corresponding to the first IPv6 address. In other words, only in response to the first node not being able to establish the neighbor cache entry based on the third packet, the first node chooses to determine, from the second area, the identification information that is of the target interface and that matches the identification information of the first interface. In this way, the MAC address corresponding to the identification information of the target interface is learned based on the correspondence included in the second area, and service forwarding can be performed by using the learned MAC address, to avoid the service interruption.

According to a third aspect, a communication apparatus is provided. The communication apparatus is a first node. The first node includes a transceiver module and a processing module. The transceiver module is configured to receive a first packet from a second node. The first packet includes a source internet protocol version 6 IPv6 address of a data packet, and the source IPv6 address of the data packet is a next-hop address in a routing table or a forwarding table of the first node. The processing module is configured to establish a first neighbor cache entry. A destination IPv6 address included in the first neighbor cache entry is the source IPv6 address of the data packet.

Optionally, with reference to the third aspect, in response to the first node establishing the first neighbor cache entry, the processing module is configured to preferentially overwrite a second neighbor cache entry with the first neighbor cache entry. A destination IPv6 address included in the second neighbor cache entry is not the next-hop address in the routing table or the forwarding table of the first node.

Optionally, with reference to the third aspect, a first area that is in the first node and that stores a neighbor cache entry is fully occupied. The first area is a neighbor cache table. The neighbor cache entry in the first area includes a destination IPv6 address. The second neighbor cache entry is included in the first area. In response to preferentially overwriting the second neighbor cache entry with the first neighbor cache entry, the processing module is configured to change the second neighbor cache entry to the first neighbor cache entry.

Optionally, with reference to the third aspect, the neighbor cache entry in the first area further includes aging time, and the second neighbor cache entry is a neighbor cache entry in which aging time is the shortest in the first area.

Optionally, with reference to the third aspect, a second area that is in the first node and that stores a neighbor cache entry is fully occupied. The second area is a neighbor cache table. The neighbor cache entry in the second area includes priority information and a destination IPv6 address. The second neighbor cache entry is included in the second area. In response to preferentially overwriting the second neighbor cache entry with the first neighbor cache entry, the processing module is configured to change the second neighbor cache entry to the first neighbor cache entry. Priority information included in the second neighbor cache entry is lower than priority information included in a third neighbor cache entry in the second area, and a destination IPv6 address included in the third neighbor cache entry is the next-hop address in the routing table or the forwarding table of the first node.

Optionally, with reference to the third aspect, the neighbor cache entry in the second area further includes aging time, and the second neighbor cache entry is a neighbor cache entry in which aging time is the shortest in the second area.

Optionally, with reference to the third aspect, areas in the first node that store a neighbor cache entry include a third area and a fourth area. The third area and the fourth area are neighbor cache tables. A destination IPv6 address included in a neighbor cache entry in the third area is the next-hop address in the routing table or the forwarding table of the first node. A destination IPv6 address included in a neighbor cache entry in the fourth area is not the next-hop address in the routing table or the forwarding table of the first node. The fourth area is fully occupied. In response to the first node establishing the neighbor cache entry, the processing module is configured to establish the first neighbor cache entry in the third area.

Optionally, with reference to the third aspect, in response to establishing the first neighbor cache entry in the third area, the processing module is configured to: determine whether a fourth neighbor cache entry exists in the third area, where a MAC address included in the fourth neighbor cache entry is an invalid value, and a destination IPv6 address included in the fourth neighbor cache entry is the source IPv6 address of the data packet, and in response to the fourth neighbor cache entry existing, change the fourth neighbor cache entry to the first neighbor cache entry; or in response to the fourth neighbor cache entry not existing, establish the first neighbor cache entry in the third area.

According to a fourth aspect, a communication apparatus is provided. The communication apparatus is a first node, and the first node includes a transceiver module and a processing module. The processing module is configured to obtain a first IPv6 address corresponding to a first packet. The processing module is further configured to search a first area for a media access control MAC address corresponding to the first IPv6 address. The first area is a neighbor cache table. In response to the MAC address corresponding to the first IPv6 address not being found in the first area, the processing module is further configured to obtain, from a second area based on identification information of a first interface, the MAC address corresponding to the first IPv6 address. The first interface is an outbound interface of the first packet. The outbound interface is an Ethernet main interface or virtual local area network VLAN sub-interface, or the outbound interface is an Eth-trunk main interface or VLAN sub-interface. The second area includes a correspondence between identification information of an interface and a MAC address. The transceiver module is configured to send the first packet based on the MAC address corresponding to the first IPv6 address.

Optionally, with reference to the fourth aspect, the first packet includes a source IPv6 address and a destination IPv6 address. In response to the source IPv6 address and the destination IPv6 address being addresses in different network segments, the first IPv6 address is a next-hop address obtained by the first node from a routing table or a forwarding table of the first node based on the first packet. In response to the source IPv6 address and the destination IPv6 address being addresses in a same network segment, the first IPv6 address is the destination IPv6 address.

Optionally, with reference to the fourth aspect, the transceiver module is further configured to obtain a router advertisement RA packet or a dynamic host configuration protocol DHCP packet from the first interface. The RA packet or the DHCP packet includes a source MAC address of a data packet. The processing module is further configured to establish, in the second area, a correspondence between the identification information of the first interface and the source MAC address based on the identification information of the first interface and the source MAC address.

Optionally, with reference to the fourth aspect, in response to the RA packet being obtained from the first interface, in response to the processing module receiving, from the first interface by using the transceiver module, an RA packet sent by one router node, the processing module is configured to determine the RA packet sent by the router node as the RA packet; or in response to the processing module receiving, from the first interface by using the transceiver module, RA packets sent by a plurality of router nodes, the processing module is configured to determine a high-priority RA packet in the RA packets sent by the plurality of router nodes as the RA packet.

Optionally, with reference to the fourth aspect, the transceiver module is further configured to send a second packet. The second packet is used to request a MAC address corresponding to the first IPv6 address. The transceiver module is further configured to receive a third packet. The third packet includes the MAC address corresponding to the first IPv6 address. In response to obtaining, from the second area based on the identification information of the first interface, the MAC address corresponding to the first IPv6 address, the processing module is further configured to: in response to a neighbor cache entry not being established in the first area based on the third packet, determine, from the second area, identification information that is of the target interface and that matches the identification information of the first interface; and obtain, based on the correspondence included in the second area, a MAC address corresponding to the identification information of the target interface, and use the address as the MAC address corresponding to the first IPv6 address.

According to a fifth aspect, a communication apparatus is provided. The communication apparatus includes a processor and a memory. The processor invokes a computer program stored in the memory to implement the method according to either of the first aspect or the second aspect.

In at least one embodiment, the communication apparatus may be a chip or a device including a chip that implements the method according to the first aspect or the second aspect.

According to a sixth aspect, a computer-readable storage medium is provided. The computer-readable storage medium stores a computer program. In response to the computer program being run, the method according to either of the first aspect or the second aspect is implemented.

According to a seventh aspect, a computer program product including instructions is provided. In response to the instructions being executed on a computer, the method according to either of the first aspect or the second aspect is performed.

According to an eighth aspect, a communication system is provided. The communication system includes one or more of the following: the first node and the second node.

BRIEF DESCRIPTION OF DRAWINGS

The following briefly describes accompanying drawings used in describing embodiments.

DESCRIPTION OF EMBODIMENTS

Figure 1:
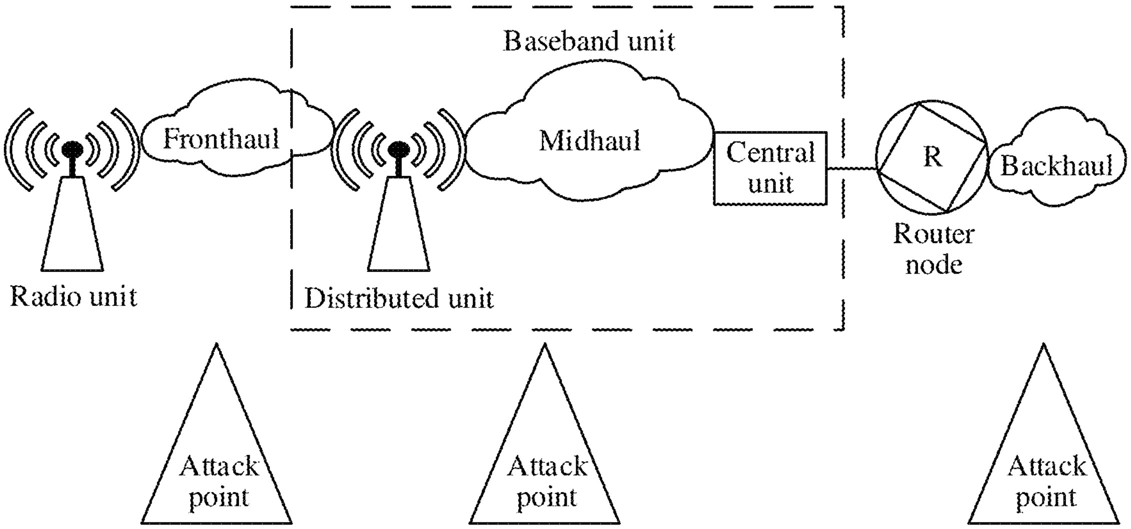
FIG. 1 shows a basic architecture of a communication system according to at least one embodiment.

The following describes the technical solutions provided in at least one embodiment with reference to the accompanying drawings in at least one embodiment. The terms "system" and "network" may be used interchangeably in at least one embodiment. "/" represents an "or" relationship between associated objects unless otherwise specified. For example, A/B may represent A or B. The term "and/or" described herein is merely an association relationship for describing associated objects, and represents that three relationships may exist. For example, A and/or B may represent the following three cases: Only A exists, both A and B exist, and only B exists, where A and B each may be singular or plural. In addition, in the descriptions of at least one embodiment, "a plurality of" means two or more than two unless otherwise specified. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions of at least one embodiment, terms such as "first" and "second" are used in at least one embodiment to distinguish between same items or similar items that provide basically same network elements or functions. A person skilled in the art may understand that the terms such as "first" and "second" do not limit a quantity or an execution sequence, and the terms such as "first" and "second" do not indicate a definite difference.

Reference to "an embodiment", "some embodiments", or the like described in at least one embodiment means that at least one embodiment includes a specific feature, structure, or characteristic described with reference to embodiments. Therefore, statements such as "in an embodiment", "in some embodiments", "in some other embodiments", and "in other embodiments" that appear at different places in at least one embodiment do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In the following specific implementations, objectives, technical solutions, and beneficial effects of at least one embodiment are further described in detail. The following descriptions are merely specific implementations of at least one embodiment, but are not intended to limit the protection scope of embodiments described herein. Any modification, equivalent replacement, improvement, or the like made based on the technical solutions of at least one embodiment shall fall within the protection scope of embodiments described herein.

In at least one embodiment, unless otherwise stated or there is a logic conflict, terms and/or descriptions in different embodiments are consistent and may be mutually referenced, and technical features in different embodiments may be combined based on an internal logical relationship thereof, to form a new embodiment.

The following describes some terms involved in at least one embodiment. In response to the following nouns being involved in another part of at least one embodiment, no explanation or description is provided subsequently.

1. Neighbor Discovery (ND)

An ND protocol replaces and improves an internet protocol version 4 (IPv4) address resolution protocol (ARP) message, an internet control message protocol router discovery (ICMP Router Discovery) message, and an internet control message protocol redirect message. Specifically, functions provided by the ND protocol include: address resolution, stateless address auto-configuration, and route redirection. The address resolution function is used to determine a MAC address of a target node, to implement interworking between a layer 3 network and a layer 2 network.

In the ND protocol, a neighbor solicitation (NS) packet and a neighbor advertisement (NA) packet are exchanged between nodes to parse an IPv6 address to obtain a media access control (MAC) address. Information including the MAC address obtained through parsing, the IPv6 address, and the like is used to establish a neighbor cache entry in a neighbor cache table.

For example, a first node sends an NS packet to a second node. The NS packet includes an IPv6 address of the first node, a MAC address of the first node, and a multicast address corresponding to the second node. After the second node receives the NS packet, the second node processes the NS packet based on the multicast address included in the NS packet. For example, the second node may first determine whether the multicast address is a multicast address corresponding to the second node. In response to the multicast address being the multicast address corresponding to the second node, the second node updates a neighbor cache table of the second node based on the IPv6 address of the first node and the MAC address of the first node that are included in the NS packet. In other words, the second node may establish a neighbor cache entry in the neighbor cache table based on the IPv6 address of the first node and the MAC address of the first node that are included in the NS packet.

According to the ND protocol, in response to receiving the NS packet, the second node is to provide a feedback for the NS packet. In other words, the second node is to send an NA packet to the second node that sends the NS packet. The NA packet includes an IPv6 address and a MAC address that are of the second node. After receiving the NA packet, the second node may update a neighbor cache table of the second node based on the IPv6 address and the MAC address that are of the second node and that are included in the NA packet. In other words, the first node may establish a neighbor cache entry in the neighbor cache table based on the IPv6 address and the MAC address that are of the second node and that are included in the NA packet. In this way, the first node and the second node learn the MAC addresses of each other, and therefore may communicate with each other.

2. Neighbor Cache Table

The neighbor cache table is used to store a neighbor cache entry. The neighbor cache table may include one or more neighbor cache entries. This is not limited herein.

Optionally, the neighbor cache entry in the neighbor cache table may be implemented in either of the following manners. This is not limited herein.

Manner 1.1: The neighbor cache entry is implemented by using a destination IPv6 address, a MAC address, a state, and aging time. In other words, the neighbor cache entry in the neighbor cache table includes the destination IPv6 address, the MAC address, the state, and the aging time. The neighbor cache entry in the neighbor cache table may further include a correspondence between the destination IPv6 address, the MAC address, the state, and the aging time.

Manner 1.2: The neighbor cache entry is implemented by using a destination IPv6 address, a MAC address, a state, aging time, and priority information. In other words, the neighbor cache entry in the neighbor cache table includes the destination IPv6 address, the MAC address, the state, the aging time, and the priority information. The neighbor cache entry in the neighbor cache table may further include a correspondence between the destination IPv6 address, the MAC address, the state, the aging time, and the priority information.

The destination IPv6 address in the neighbor cache table may be a next-hop address in a routing table or a forwarding table of the first node, and/or, the destination IPv6 address in the neighbor cache table is not the next-hop address in the routing table or the forwarding table of the first node. This is not limited herein. In at least one embodiment, the routing table may be referred to as a routing information base (RIB), and the forwarding table may be referred to as a forwarding information base (FIB). The first node may dynamically configure the next-hop address in the routing table or the forwarding table of the first node. In other words, the next-hop address in the routing table or the forwarding table of the first node may be dynamically adjusted. For example, at a first moment, a destination IPv6 address included in a neighbor cache entry A is not the next-hop address in the routing table or the forwarding table of the first node. At a second moment, the first node re-adjusts the next-hop address in the routing table or the forwarding table of the first node. In this case, the destination IPv6 address included in the neighbor cache entry A changes to the next-hop address in the routing table or the forwarding table of the first node. The first moment is earlier than the second moment.

The state may include one of the following: an incomplete state, a reachable state, a stale state, a delay state, a probe state, and an empty state. Different nodes may manage states of the nodes by using neighbor cache entries. For example, in response to the first node communicating with the second node, the first node actively initiates learning of a neighbor cache entry, and performs a state migration on the neighbor cache entry based on triggering of a packet and a feedback of the second node. Specifically, a state included in the neighbor cache entry may change from the incomplete state to the reachable state, from the reachable state to the empty state, or the like. Examples are not listed one by one herein. In response to the state included in the neighbor cache entry changing from the incomplete state to the reachable state, both the nodes have learned MAC addresses of each other. In this case, the two nodes may communicate with each other. In response to the state included in the neighbor cache entry changing from the reachable state to the empty state, the neighbor cache entry is to be deleted.

A function of setting the aging time is: In response to a packet for updating a specific neighbor cache entry not being received within specified aging time, the neighbor cache entry is deleted. In other words, the neighbor cache entry is aged.

In response to an IPv6 address included in the neighbor cache entry being the next-hop address in the routing table or the forwarding table of the first node, priority information included in the neighbor cache entry is higher than priority information corresponding to a neighbor cache entry in which an IPv6 address is not the next-hop address in the routing table or the forwarding table of the first node.

For example, in response to the IPv6 address included in the neighbor cache entry A being the next-hop address in the routing table or the forwarding table of the first node, and an IPv6 address included in a neighbor cache entry B is not the next-hop address in the routing table or the forwarding table of the first node, priority information included in the neighbor cache entry A is higher than priority information included in the neighbor cache entry B.

3. A router advertisement (RA) packet and a dynamic host configuration protocol (DHCP) packet may be used to configure an IPv6 address.

For example, a node A may send a router solicitation (RS) packet. The RS packet is used to request network prefix information. After receiving the RS packet, a router node may send an RA packet, where the RA packet may include the network prefix information. After receiving the RA packet, the node A may configure an IPv6 address based on the network prefix information included in the RA packet and identification information of an interface of the node A. The identification information of the interface may be identification information of an Ethernet main interface or virtual local area network (VLAN) sub-interface, or the identification information of the interface may be identification information of an Eth-Trunk main interface or VLAN sub-interface. This is not limited herein. For example, the identification information of the interface may be ETH_0/vlan 200, and ETH_0/vlan 200 indicates a VLAN sub-interface 200 of an Ethernet main interface 0.

The RA packet may be, for example, a packet sent by the router node. A source MAC address included in the RA packet may be, for example, a MAC address of the router node. The MAC address of the router node may be, for example, a MAC address corresponding to a next-hop address in a forwarding table of the node A. Therefore, in at least one embodiment, after a correspondence between the source MAC address included in the RA packet and the identification information of the interface of the node A is established, in response to a specific packet being sent, the node A may learn, based on the correspondence and identification information of an interface corresponding to the packet, a MAC address corresponding to the packet.

In addition, the RA packet may further include priority information of the router node, to enable a specific node to send, based on the priority information of the router node, a packet to a high-priority router node. In at least one embodiment, the first node may receive an RA packet sent by one or more router nodes. In response to the first node receiving an RA packet sent by one router node, the first node directly establishes, based on a source MAC address included in the RA packet and identification information of an interface corresponding to the RA packet, an entry corresponding to the RA packet. In response to the first node receiving a plurality of RA packets sent by a plurality of router nodes, the first node selects, based on priority information included in each RA packet, a source MAC address included in a high-priority RA packet in the plurality of RA packets and identification information of an interface corresponding to the high-priority RA packet, and establishes an entry corresponding to the high-priority RA packet. In at least one embodiment, one router node may periodically send an RA packet, but one router node sends only one RA packet at one moment.

The dynamic host configuration protocol (DHCP) packet may be a DHCP response packet. The DHCP response packet may be a dynamic host configuration protocol for IPv6 (DHCPv6) response packet. For example, the node A obtains an IPv6 address included in the DHCPv6 response packet to configure the IPv6 address. In an IPv6 scenario, the DHCP packet is to be sent, through the router node, a node in which the IPv6 address is to be configured. Therefore, after the DHCP packet passes through the router node, a source MAC address included in the DHCP packet is changed to the MAC address of the router node. The MAC address of the router node may be, for example, the MAC address corresponding to the next-hop address in the forwarding table of the node A. Further, in at least one embodiment, after a correspondence between the source MAC address included in the DHCP packet and the identification information of the interface of the node A is established, in response to a specific packet being sent, the node A may learn, based on the correspondence and identification information of an interface corresponding to the packet, a MAC address corresponding to the packet.

In addition, the RA packet or the DHCP packet may further include at least one of the following: a source IPv6 address, the destination IPv6 address, a destination MAC address, and the like. This is not limited in at least one embodiment.

The technical solutions of at least one embodiment may be applied to a long term evolution (LTE) architecture, a 5th generation (5G) mobile communication technology, and the like. The technical solutions of at least one embodiment may be further applied to another future communication system, for example, a 6G communication system. In the future communication system, a same function may be maintained, but a name may be changed.

The following describes a basic architecture of a communication system provided in at least one embodiment.

FIG. 1 shows a basic architecture of a communication system according to at least one embodiment. As shown in FIG. 1, the communication system may include a central unit (CU), a distributed unit (DU), a radio unit (RU), and a router node. FIG. 1 is merely a schematic, and does not constitute a limitation on a scenario to which the technical solutions provided in at least one embodiment are applicable.

The DU and the CU in FIG. 1 may be separately deployed, or integrated into a baseband unit (BBU). This is not limited herein. In response to the DU and the CU being integrated into the BBU, midhaul is not included in FIG. 1.

In at least one embodiment, the router node may be a layer 3 switch.

In addition, with reference to FIG. 1, an attack point of a flood attack may occur in fronthaul, midhaul, or backhaul. Therefore, in scenarios such as the fronthaul, the midhaul, and the backhaul, a case in which a neighbor cache entry used by some services is overwritten by a neighbor cache entry of an attack packet may occur. In other words, in the scenarios such as the fronthaul, the midhaul, and the backhaul, a first node may be the CU, the DU, the RU, or the router node shown in FIG. 1. This is not limited herein. Certainly, in response to the DU and the RU being integrated into the BBU, the first node may be the BBU.

Figure 2:
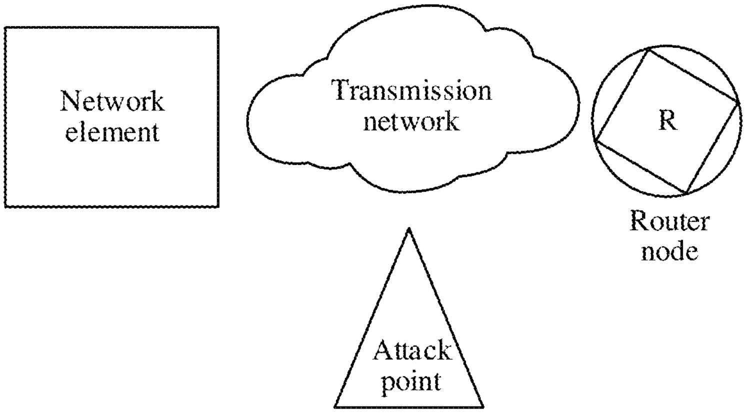
FIG. 2 shows a basic architecture of another communication system according to at least one embodiment.

FIG. 2 shows a basic architecture of another communication system according to at least one embodiment. As shown in FIG. 2, the communication system may include a network element and a router node. FIG. 2 is merely a schematic, and does not constitute a limitation on a scenario to which the technical solutions provided in at least one embodiment are applicable.

The network element may be, for example, a core network device, a security gateway, a host node, or a telecommunications device. This is not limited herein. The core network device may be, for example, a network element included in a data network (DN) in a 5G network architecture, or a network element included in an operator network in a 5G network architecture. The telecommunications device may be, for example, a charging gateway, a domain name system (DNS), or a content delivery network (CDN). This is not limited herein.

In addition, with reference to FIG. 2, an attack point of a flood attack may occur in a transmission network between the network element and the router node. Therefore, in this scenario, a first node may be the network element or the router node shown in FIG. 2. This is not limited herein.

In at least one embodiment, a second node is another node that communicates with the first node. A specific type is not limited herein.

The following describes the technical solutions provided in at least one embodiment with reference to the accompanying drawings. In at least one embodiment, mainly two solutions are used to avoid service interruption. Solution 1: In response to a source IPv6 address of a data packet included in an NS packet or an NA packet being a next-hop address in a routing table or a forwarding table of a first node, a neighbor cache entry is established. In this way, the established neighbor cache entry can be stored, and the first node can learn the neighbor cache entry, and perform service forwarding by using the learned information, for example, perform service forwarding by using a learned MAC address, to avoid the service interruption. For details, refer to FIG. 3. Solution 2: In response to a MAC address corresponding to an IPv6 address not being found in a neighbor cache table, the MAC address corresponding to the IPv6 address may be obtained based on identification information of an outbound interface. Therefore, service forwarding may be performed based on the MAC address corresponding to the IPv6 address, to avoid the service interruption. For details, refer to FIG. 4.

Figure 3:
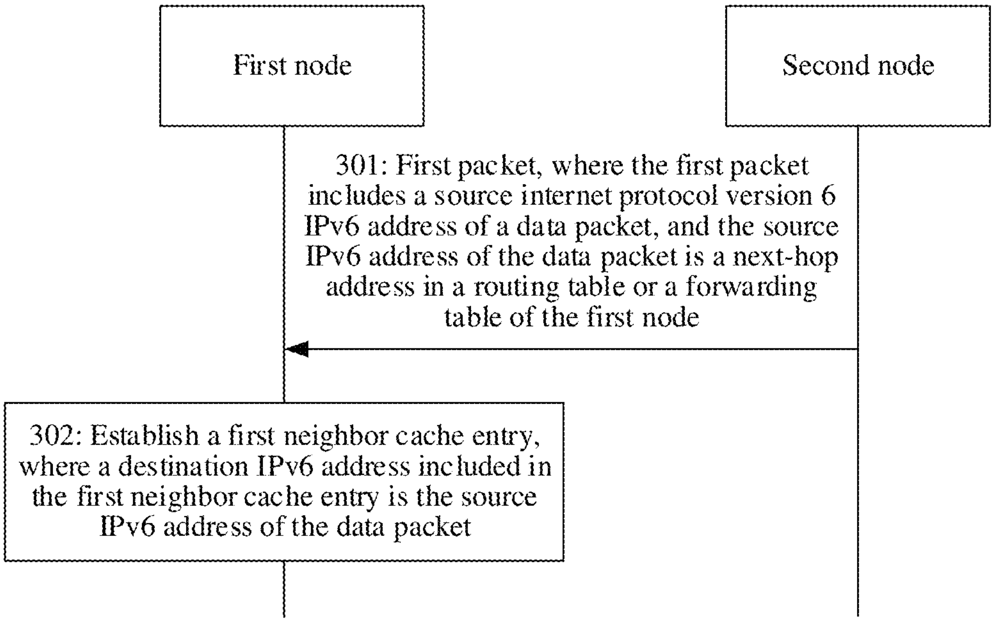
FIG. 3 is a schematic flowchart of a flood attack defense method according to at least one embodiment.

FIG. 3 is a schematic flowchart of a flood attack defense method according to at least one embodiment. As shown in FIG. 3, the method includes but is not limited to the following steps.

301: A second node sends a first packet to a first node. The first packet includes a source IPv6 address of a data packet. The source IPv6 address of the data packet is a next-hop address in a routing table or a forwarding table of the first node.

Correspondingly, the first node receives the first packet from the second node. For example, the first node receives the first packet from the second node through a first interface. The first interface is an Ethernet main interface or virtual local area network VLAN sub-interface, or the first interface is an Eth-trunk main interface or VLAN sub-interface. The first node may include a plurality of interfaces, and the plurality of interfaces may include the first interface. For a specific manner in which the first node establishes a neighbor cache entry in response to receiving an NS packet or an NA packet through an interface other than the first interface in the plurality of interfaces, refer to a process in which the first node establishes the neighbor cache entry in response to receiving the NS packet or the NA packet through the first interface. Details are not described herein.

Optionally, the first packet may be the NS packet or the NA packet. This is not limited herein. The NS packet or the NA packet may further include at least one of the following: a source MAC address of the data packet, a destination IPv6 address of the data packet, a destination MAC address of the data packet, and the like. This is not limited herein.

For the routing table and the forwarding table, refer to the foregoing related descriptions. Details are not described herein again.

302: The first node establishes a first neighbor cache entry. A destination IPv6 address included in the first neighbor cache entry is the source IPv6 address of the data packet.

Optionally, the first neighbor cache entry may further include at least one of the following: a MAC address, a state, and aging time. The MAC address included in the first neighbor cache entry is the source MAC address of the data packet. The first neighbor cache entry may further include a correspondence between the destination IPv6 address and one or more of the MAC address, the state, and the aging time. For the state, refer to the foregoing related descriptions. Details are not described herein again. In addition, the first neighbor cache entry may further include priority information. The first neighbor cache entry may further include a correspondence between the destination IPv6 address and one or more of the MAC address, the state, the aging time, and the priority information.

The first neighbor cache entry may be stored in one area that stores an entry and that is of the first interface. One area is one neighbor cache table, and one neighbor cache table may include one or more neighbor cache entries. The neighbor cache table may be implemented in the foregoing manner 1.1 or manner 1.2. In addition, one neighbor cache table, for example, a third area, may include neighbor cache entries in which destination IPv6 addresses are next-hop addresses in the routing table or the forwarding table of the first node. Alternatively, one neighbor cache table, for example, a fourth area, may include neighbor cache entries in which destination IPv6 addresses are not next-hop addresses in the routing table or the forwarding table of the first node. Alternatively, one neighbor cache table, for example, a first area or a second area, may include both a neighbor cache entry in which a destination IPv6 address is the next-hop address in the routing table or the forwarding table of the first node and a neighbor cache entry in which a destination IPv6 address is not the next-hop address in the routing table or the forwarding table of the first node.

For example, in response to the neighbor cache table of the first node including the destination IPv6 address, the MAC address, the state, and the aging time, and the neighbor cache table includes the neighbor cache entries in which the destination IPv6 addresses are the next-hop addresses in the routing table or the forwarding table of the first node, refer to Table 1. Table 1 is a neighbor cache table of the first node according to at least one embodiment. With reference to Table 1, the neighbor cache table includes a neighbor cache entry in which a destination IPv6 address is 2222::1111 and a neighbor cache entry in which a destination IPv6 address is 2431::2331. Both 2222::1111 and 2431::2331 are next-hop addresses in the routing table or the forwarding table of the first node. In addition, the neighbor cache entry in which the destination IPv6 address is 2222::1111 and the neighbor cache entry in which the destination IPv6 address is 2431::2331 further include MAC addresses, states, and aging time. For example, the MAC address included in the neighbor cache entry in which the destination IPv6 address is 2222::1111 is XX:XX:XX:XX:XX:XX. This indicates that the MAC address is a valid value. In other words, the MAC address included in the neighbor cache entry in which the destination IPv6 address is 2222::1111 is a MAC address of a node that communicates with the first node, that is, the first node has learned the neighbor cache entry. The MAC address included in the neighbor cache entry in which the destination IPv6 address is 2431::2331 is 00:00:00:00:00:00. This indicates that the MAC address is an invalid value. In other words, in this case, the first node does not learn the MAC address of the node that communicates with the first node, that is, the first node does not learn the neighbor cache entry. The state included in the neighbor cache entry in which the destination IPv6 address is 2222::1111 is a reachable state. This indicates that the first node and the node that communicates with the first node have learned the MAC addresses of each other. The state included in the neighbor cache entry in which the destination IPv6 address is 2431::2331 is an incomplete state. This indicates that the first node does not learn the MAC address of the node that communicates with the first node, and the node that communicates with the first node does not learn the MAC address of the first node. In addition, the aging time included in the neighbor cache entry in which the destination IPv6 address is 2222::1111 is 5 minutes, and the aging time included in the neighbor cache entry in which the destination IPv6 address is 2431::2331 is NULL.

In response to configuring the neighbor cache entry of the next-hop address in the routing table or the forwarding table, the first node may configure a neighbor cache entry in which the MAC address is an invalid value, or may not configure a neighbor cache entry in which the MAC address is an invalid value. This is not limited herein. In response to the first node configuring the neighbor cache entry in which the MAC address is the invalid value, subsequently, the first node may preferentially overwrite the neighbor cache entry in which the MAC address is the invalid value after a neighbor cache entry is learned. In response to the first node not configuring the neighbor cache entry in which the MAC address is the invalid value, subsequently, the first node may establish a new neighbor cache entry after a neighbor cache entry is learned.

TABLE 1

| Destination IPv6 address | MAC address | State | Aging time (minutes) |
|---|---|---|---|
| 2222::1111 | XX:XX:XX:XX:XX:XX | Reachable | 5 |
| 2431::2331 | 00:00:00:00:00:00 | Incomplete | NULL |

For another example, in response to the neighbor cache table of the first node including the destination IPv6 address, the MAC address, the state, and the aging time, and the neighbor cache table includes the neighbor cache entries in which the destination IPv6 addresses are not the next-hop addresses in the routing table or the forwarding table of the first node, refer to Table 2. Table 2 is another neighbor cache table of the first node according to at least one embodiment. With reference to Table 2, the neighbor cache table includes a neighbor cache entry in which a destination IPv6 address is 2000::1000 and a neighbor cache entry in which a destination IPv6 address is 2001::2000, 2000::1000 or 2001::2000 are not the next-hop addresses in the routing table or the forwarding table of the first node. In addition, the neighbor cache entry in which a destination IPv6 address is 2000::1000 and the neighbor cache entry in which a destination IPv6 address is 2001::2000 further include MAC addresses, states, and aging time. For example, the MAC addresses included in the neighbor cache entry in which the destination IPv6 address is 2000::1000 and the neighbor cache entry in which the destination IPv6 address is 2001::2000 are XX:XX:XX:XX:XX:XX. This indicates that the MAC addresses are valid values. In other words, the first node has learned the neighbor cache entry. The states included in the neighbor cache entry in which the destination IPv6 address is 2000::1000 and the neighbor cache entry in which the destination IPv6 address is 2001::2000 are both reachable states. This indicates that the first node and a node that communicates with the first node have learned MAC addresses of each other. In addition, the aging time included in the neighbor cache entry in which the destination IPv6 address is 2000::1000 is 8 minutes, and the aging time included in the neighbor cache entry in which the destination IPv6 address is 2001::2000 is 10 minutes.

TABLE 2

| Destination IPv6 address | MAC address | State | Aging time (minutes) |
|---|---|---|---|
| 2000::1000 | XX:XX:XX:XX:XX:XX | Reachable | 8 |
| 2001::2000 | XX:XX:XX:XX:XX:XX | Reachable | 10 |

For another example, in response to the neighbor cache table of the first node including the destination IPv6 address, the MAC address, the state, the aging time, and the priority information, and the neighbor cache table includes both the neighbor cache entry in which the destination IPv6 address is the next-hop address in the routing table or the forwarding table of the first node and the neighbor cache entry in which the destination IPv6 address is not the next-hop address in the routing table or the forwarding table of the first node, refer to Table 3. Table 3 is another neighbor cache table of the first node according to at least one embodiment. With reference to Table 3, the neighbor cache table includes a neighbor cache entry in which the destination IPv6 address is 2000::1000, a neighbor cache entry in which the destination IPv6 address is 2001::2000, a neighbor cache entry in which the destination IPv6 address is 2222::1111, and a neighbor cache entry in which the destination IPv6 address is 2431::2331, 2000::1000 and 2001::2000 are not next-hop addresses in the routing table or the forwarding table of the first node. 2222::1111 and 2431::2331 are both next-hop addresses in the routing table or the forwarding table of the first node. Priority information included in the neighbor cache entry in which the destination IPv6 address is 2000::1000 and the neighbor cache entry in which the destination IPv6 address is 2001::2000 is low. Priority information included in the neighbor cache entry in which the destination IPv6 address is 2222::1111 and the neighbor cache entry in which the destination IPv6 address is 2431::2331 is high. In other words, the priority information included in the neighbor cache entry in which a destination IPv6 address is the next-hop address in the routing table or the forwarding table of the first node is higher than the priority information included in the neighbor cache entry in which a destination IPv6 address is not the next-hop address in the routing table or the forwarding table of the first node. In addition, for other content in Table 3, refer to Table 1 and Table 2. Details are not described herein again.

TABLE 3

| Destination IPv6 address | MAC address | State | Aging time (minutes) | Priority information |
|---|---|---|---|---|
| 2000::1000 | XX:XX:XX:XX:XX:XX | Reachable | 8 | Low |
| 2001::2000 | XX:XX:XX:XX:XX:XX | Reachable | 10 | Low |
| 2222::1111 | XX:XX:XX:XX:XX:XX | Reachable | 5 | High |
| 2431::2331 | 00:00:00:00:00:00 | Incomplete | NULL | High |

The second neighbor cache entry may further include content in the foregoing manner 1.1 or manner 1.2 other than the destination IPv6 address. Details are not described herein again.

The first area, the second area, the third area, and the fourth area are all neighbor cache tables. The first area may be implemented in the foregoing manner 1.1 or manner 1.2. The second area may be implemented in the foregoing manner 1.2. The first area and the third area may be implemented in the foregoing manner 1.1 or manner 1.2. Any area in the fourth area may be implemented in the foregoing manner 1.1 or manner 1.2. In addition, in at least one embodiment, the first neighbor cache entry may be stored in the first area that stores an entry and that is of the first interface. In at least one embodiment, the first neighbor cache entry may be stored in the second area that stores an entry and that is of the first interface. In at least one embodiment, the first neighbor cache entry may be stored in the third area that stores an entry and that is of the first interface. The third area and the fourth area are different areas that store an entry and that are of the first interface.

Optionally, step 302 may be implemented in either of the following manners. This is not limited herein.

Manner 2.1: The first node preferentially overwrites a second neighbor cache entry with the first neighbor cache entry. A destination IPv6 address included in the second neighbor cache entry is not the next-hop address in the routing table or the forwarding table of the first node. In other words, the first node may preferentially overwrite the second neighbor cache entry in which the destination IPv6 address is not the next-hop address in the routing table or the forwarding table of the first node with the first neighbor cache entry. In this way, the first neighbor cache entry can be stored in a flood attack scenario, and the first node can learn the neighbor cache entry and perform service forwarding by using the learned information, to avoid service interruption.

Manner 2.2: Areas in the first node that store a neighbor cache entry include the third area and the fourth area. The third area and the fourth area are neighbor cache tables. A destination IPv6 address included in a neighbor cache entry in the third area is the next-hop address in the routing table or the forwarding table of the first node. A destination IPv6 address included in a neighbor cache entry in the fourth area is not the next-hop address in the routing table or the forwarding table of the first node. The fourth area is fully occupied. The first node establishes the first neighbor cache entry in the third area. In other words, in a flood attack scenario, in response to the fourth area being fully occupied, the first node may still establish the first neighbor cache entry in the third area. In this way, the first neighbor cache entry can be stored, and the first node can learn the neighbor cache entry and perform service forwarding by using the learned information, to avoid service interruption.

Optionally, the foregoing manner 2.1 may be implemented in either of the following manners. This is not limited herein.

Manner 3.1: The first area that is in the first node and that stores a neighbor cache entry is fully occupied. The first area is a neighbor cache table. The neighbor cache entry in the first area includes a destination IPv6 address. The second neighbor cache entry is included in the first area. The first node changes the second neighbor cache entry to the first neighbor cache entry. In other words, in the flood attack scenario, in response to the first area being fully occupied, the first node changes the second neighbor cache entry in which the destination IPv6 address is not the next-hop address in the routing table or the forwarding table of the first node to the first neighbor cache entry. In this way, the first neighbor cache entry can be stored, and the first node can learn the neighbor cache entry and perform service forwarding by using the learned information, to avoid the service interruption.

Manner 3.2: The second area that is in the first node and that stores a neighbor cache entry is fully occupied. The second area is a neighbor cache table. The neighbor cache entry in the second area includes priority information and a destination IPv6 address. The second neighbor cache entry is included in the second area. The first node changes the second neighbor cache entry to the first neighbor cache entry. Priority information included in the second neighbor cache entry is lower than priority information included in a third neighbor cache entry in the second area, and a destination IPv6 address included in the third neighbor cache entry is the next-hop address in the routing table or the forwarding table of the first node. In other words, in the flood attack scenario, in response to the second area being fully occupied, the first node changes the second neighbor cache entry in which the priority information is lower than that of the third neighbor cache entry to the first neighbor cache entry. In this way, the first neighbor cache entry can be stored, and the first node can learn the neighbor cache entry and perform service forwarding by using the learned information, to avoid the service interruption.

The first area is fully occupied, and this indicates that a quantity of neighbor cache entries that can be stored in the first area reaches a preset first maximum quantity. Similarly, the second area is fully occupied, and this indicates that a quantity of neighbor cache entries that can be stored in the second area reaches a preset second maximum quantity. The fourth area is fully occupied, and this indicates that a quantity of neighbor cache entries that can be stored in the fourth area reaches a preset third maximum quantity. The preset first maximum quantity, the preset second maximum quantity, and the preset third maximum quantity may be the same or different. This is not limited herein. In addition, the preset first maximum quantity, the preset second maximum quantity, and the preset third maximum quantity each may be a quantity, a fixed value, or the like predefined in a protocol. This is not limited herein.

Optionally, for the manner 3.1, the second neighbor cache entry may be a neighbor cache entry in which aging time is the shortest in the first area. In other words, in the flood attack scenario, in response to the first area being fully occupied, the first node changes the second neighbor cache entry in which the destination IPv6 address is not the next-hop address in the routing table or the forwarding table of the first node and in which aging time is the shortest to the first neighbor cache entry. In this way, the first neighbor cache entry can be stored, and the first node can learn the neighbor cache entry and perform service forwarding by using the learned information, to avoid the service interruption.

Optionally, for the manner 3.2, the second neighbor cache entry may be a neighbor cache entry in which aging time is the shortest in the second area. In other words, in the flood attack scenario, in response to the second area being fully occupied, the first node changes the second neighbor cache entry in which the priority information is lower than that of the third neighbor cache entry and in which aging time is the shortest to the first neighbor cache entry. In this way, the first neighbor cache entry can be stored, and the first node can learn the neighbor cache entry and perform service forwarding by using the learned information, to avoid the service interruption.

In addition, in at least one embodiment, a neighbor cache entry in which priority information is low cannot overwrite a neighbor cache entry in which priority information is high. In other words, the neighbor cache entry in which a destination IPv6 address is not the next-hop address in the routing table or the forwarding table of the first node cannot overwrite the neighbor cache entry in which a destination IPv6 address is the next-hop address in the routing table or the forwarding table of the first node. At a specific moment, a destination IPv6 address in a neighbor cache entry is not the next-hop address in the routing table or the forwarding table of the first node. At another moment, the first node re-adjusts the next-hop address in the routing table or the forwarding table of the first node. In this case, the destination IPv6 address included in the neighbor cache entry changes to the next-hop address in the routing table or the forwarding table of the first node, and the first node may change priority information included in the neighbor cache entry. For example, at a first moment, a destination IPv6 address included in a neighbor cache entry A is not the next-hop address in the routing table or the forwarding table of the first node. At a second moment, the first node re-adjusts the next-hop address in the routing table or the forwarding table of the first node. In this case, the destination IPv6 address included in the neighbor cache entry A changes to the next-hop address in the routing table or the forwarding table of the first node. Therefore, at the second moment, the first node may change priority information included in the neighbor cache entry A. This is because the first node may dynamically configure the next-hop address in the routing table or the forwarding table of the first node. In other words, the next-hop address in the routing table or the forwarding table of the first node may be dynamically adjusted.

Optionally, for the manner 2.2, that the first node establishes the first neighbor cache entry in the third area includes: The first node determines whether a fourth neighbor cache entry exists in the third area. A MAC address included in the fourth neighbor cache entry is an invalid value, and a destination IPv6 address included in the fourth neighbor cache entry is the source IPv6 address of the data packet. In response to the fourth neighbor cache entry existing, the first node changes the fourth neighbor cache entry to the first neighbor cache entry; or in response to the fourth neighbor cache entry not existing, the first node establishes the first neighbor cache entry in the third area. In other words, in the flood attack scenario, the first node may still establish the first neighbor cache entry in the third area. In this way, the first neighbor cache entry can be stored, and the first node can learn the neighbor cache entry and perform service forwarding by using the learned information, to avoid the service interruption.

The fourth neighbor cache entry may further include content in the foregoing manner 1.1 or manner 1.2 other than the MAC address. Details are not described herein again.

That a MAC address included in the fourth neighbor cache entry is an invalid value may be understood as: The MAC address included in the fourth neighbor cache entry is 0. In other words, the MAC address included in the fourth neighbor cache entry is a MAC address in response to the routing table or the forwarding table of the first node taking effect but a neighbor cache entry not being learned by the first node. That the routing table or the forwarding table of the first node takes effect may be understood as: In response to the first node configuring a neighbor cache entry of the next-hop address in the routing table or the forwarding table, a neighbor cache entry in which a MAC address is an invalid address is configured.

In addition, the first node may dynamically configure the next-hop address in the routing table or the forwarding table of the first node. In other words, the next-hop address in the routing table or the forwarding table of the first node may be dynamically adjusted. Therefore, there may be a case in which the neighbor cache entry is migrated from the fourth area to the third area. For example, at the first moment, a destination IPv6 address included in a neighbor cache entry in the fourth area is not the next-hop address in the routing table or the forwarding table of the first node. At the second moment, the first node re-adjusts the next-hop address in the routing table or the forwarding table of the first node. In this case, the destination IPv6 address included in the neighbor cache entry in the fourth area changes to the next-hop address in the routing table or the forwarding table of the first node, and the first node may migrate the neighbor cache entry from the fourth area to the third area.

Figure 4:
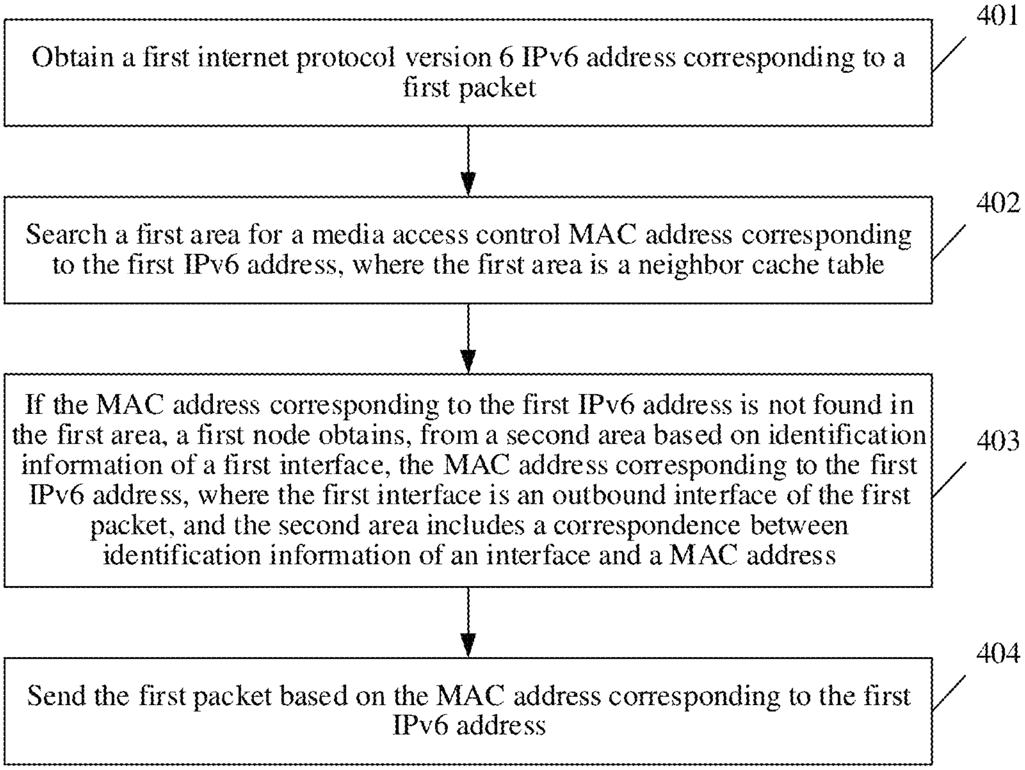
FIG. 4 is a schematic flowchart of another flood attack defense method according to at least one embodiment.

FIG. 4 is a schematic flowchart of another flood attack defense method according to at least one embodiment. As shown in FIG. 4, the method includes but is not limited to the following steps.

401: A first node obtains a first IPv6 address corresponding to a first packet.

The first packet may be, for example, an NS packet, an NA packet, or another packet. This is not limited herein. The first packet may include at least one of the following: a source IPv6 address, a destination IPv6 address, a source MAC address, a destination MAC address, and the like. This is not limited herein. In addition, the source IPv6 address is an IPv6 address of the first node. The source MAC address is a MAC address of the first node. The destination MAC address is a MAC address corresponding to the first IPv6 address.

Optionally, in response to the source IPv6 address and the destination IPv6 address being addresses in different network segments, the first IPv6 address is a next-hop address obtained by the first node from a routing table or a forwarding table of the first node based on the first packet. In response to the source IPv6 address and the destination IPv6 address being addresses in a same network segment, the first IPv6 address is the destination IPv6 address. In other words, whether the source IPv6 address and the destination IPv6 address are the addresses in the same network segment is determined, to determine first IPv6 addresses in different networking scenarios.

That the source IPv6 address and the destination IPv6 address are addresses in different network segments may be understood as: A first network address and a second network address are different. The first network address is obtained by the first node based on a bitwise AND operation on the source IPv6 address and a subnet mask. The second network address is obtained by the first node based on a bitwise AND operation on the destination IPv6 address and a subnet mask. Similarly, that the source IPv6 address and the destination IPv6 address are addresses in a same network segment may be understood as: The first network address and the second network address are the same.

That the first IPv6 address is a next-hop address obtained from a routing table or a forwarding table of the first node based on the first packet may be understood as: The first IPv6 address is the next-hop address obtained from the routing table or the forwarding table of the first node based on the source IPv6 address and/or the destination IPv6 address.

402: The first node searches a first area for the MAC address corresponding to the first IPv6 address. The first area is a neighbor cache table.

The neighbor cache table in step 402 may be implemented in the foregoing manner 1.1 or manner 1.2. This is not limited herein. The neighbor cache table in step 402 is a neighbor cache table of a second interface. The second interface is an interface determined by the first node based on the routing table or the forwarding table of the first node. The second interface may be an Ethernet main interface or virtual local area network VLAN sub-interface, or the second interface may be an Eth-trunk main interface or VLAN sub-interface. This is not limited herein.

Optionally, step 402 may include: The first node searches the first area for a MAC address in a neighbor cache entry in which a destination IPv6 address is the same as the first IPv6 address, and uses the address as the MAC address corresponding to the first IPv6 address. In other words, MAC address learning is implemented.

403: In response to the MAC address corresponding to the first IPv6 address not being found in the first area, the first node obtains, from a second area based on identification information of a first interface, the MAC address corresponding to the first IPv6 address. The first interface is an outbound interface of the first packet. The second area includes a correspondence between identification information of an interface and a MAC address.

The outbound interface is an Ethernet main interface or virtual local area network VLAN sub-interface, or the outbound interface is an Eth-trunk main interface or VLAN sub-interface. The identification information of the first interface may be identification information of the Ethernet main interface or virtual local area network VLAN sub-interface, or identification information of the Eth-trunk main interface or VLAN sub-interface.

Optionally, the first interface and the second interface are a same interface.

That the second area includes a correspondence between identification information of an interface and a MAC address may be understood as: The second area includes a correspondence between identification information of a plurality of interfaces of the first node and one MAC address, or a one-to-one correspondence between identification information of a plurality of interfaces of the first node and a plurality of MAC addresses. The plurality of interfaces of the first node may include the first interface. For an interface other than the first interface, for a process in which the first node obtains the MAC address from the second area based on identification information of the interface, refer to the process in which the first node obtains the MAC address from the second area based on the identification information of the first interface. Details are not described herein again.

Optionally, before that the first node obtains, from the second area based on the identification information of the first interface, the MAC address corresponding to the first IPv6 address, the solution may further include: The first node obtains an RA packet or a DHCP packet from the first interface. The RA packet or the DHCP packet includes a source MAC address of a data packet. The first node establishes, in the second area, a correspondence between the identification information of the first interface and the source MAC address based on the identification information of the first interface and the source MAC address. In other words, the first node obtains the RA packet or the DHCP packet from the first interface, and the first node may establish, in the second area, the correspondence between the identification information of the first interface and the source MAC address of the data packet based on the identification information of the first interface and the source MAC address included in the RA packet or the DHCP packet. In this way, the correspondence between the identification information of the first interface and the source MAC address can be stored in a flood attack scenario, and the first node may learn the MAC address based on the correspondence between the identification information of the first interface and the source MAC address, and perform service forwarding by using the learned MAC address, to avoid service interruption.

For the RA packet or the DHCP packet, refer to the foregoing related descriptions. Details are not described herein again.

Optionally, that the first node obtains an RA packet from the first interface includes: In response to an RA packet sent by one router node being received from the first interface, the first node determines the RA packet sent by the router node as the RA packet; or in response to RA packets sent by a plurality of router nodes being received from the first interface, the first node determines a high-priority RA packet in the RA packets sent by the plurality of router nodes as the RA packet. In other words, in response to the first node receiving the RA packet sent by one or more router nodes, the first node selects a corresponding RA packet in different cases, to prepare for subsequently establishing, in the second area, the correspondence between the identification information of the first interface and the source MAC address.

Optionally, the solution may further include: The first node sends a second packet. The second packet is used to request the MAC address corresponding to the first IPv6 address. The first node receives a third packet. The third packet includes the MAC address corresponding to the first IPv6 address. That the first node obtains, from a second area based on identification information of a first interface, the MAC address corresponding to the first IPv6 address includes: In response to a neighbor cache entry not being able to be established in the first area based on the third packet, the first node determines, from the second area, identification information that is of a target interface and that matches the identification information of the first interface. The first node obtains, based on the correspondence included in the second area, a MAC address corresponding to the identification information of the target interface, and uses the address as the MAC address corresponding to the first IPv6 address. In other words, only in response to the first node not being able to establish the neighbor cache entry based on the third packet, the first node chooses to determine, from the second area, the identification information that is of the target interface and that matches the identification information of the first interface. In this way, the MAC address corresponding to the identification information of the target interface is learned based on the correspondence included in the second area, and service forwarding can be performed by using the learned MAC address, to avoid the service interruption.

The second packet is an NS packet, and the NS packet may include one or more of the following: a source IPv6 address, a destination IPv6 address, a source MAC address, a destination MAC address, and the like. This is not limited herein. The source IPv6 address is the IPv6 address of the first node, and the destination IPv6 address is an IPv6 address of another node. Similarly, the source MAC address is the MAC address of the first node, and the destination MAC address is a MAC address of another node.

The third packet is an NA packet, and the NA packet may include one or more of the following: a source IPv6 address, a destination IPv6 address, a source MAC address, a destination MAC address, and the like. This is not limited herein. The source IPv6 address is an IPv6 address of another node. The source MAC address is a MAC address of another node. The destination MAC address is the MAC address of the first node. The source MAC address in the second packet is the destination MAC address of the third packet, and the destination MAC address in the second packet is the source MAC address of the third packet.

Optionally, the first node may send the second packet after the first node does not find, in the first area, the MAC address corresponding to the first IPv6 address. In other words, in response to the first node not fomdonmg, in the first area, the MAC address corresponding to the first IPv6 address, the first node may send the second packet, to request the MAC address corresponding to the first IPv6 address.

The neighbor cache entry cannot be established in the first area based on the third packet because the first area is fully occupied. In other words, in response to the first area being fully occupied due to a flood attack, the first node cannot establish, in the first area, a neighbor cache entry that includes the source IPv6 address and the source MAC address of the third packet.

404: The first node sends the first packet based on the MAC address corresponding to the first IPv6 address.

For example, the first node sends the first packet to a second node based on the MAC address corresponding to the first IPv6 address. The MAC address of the second node may be the MAC address corresponding to the first IPv6 address.

In at least one embodiment, in response to the first node not finding, in the neighbor cache table, the MAC address corresponding to the first IPv6 address, the first node may obtain, from the second area based on the identification information of the outbound interface of the first packet, the MAC address corresponding to the first IPv6 address. In this way, the first node may send the first packet based on the MAC address corresponding to the first IPv6 address, to avoid a problem in which service interruption is caused because a MAC address cannot be learned from the neighbor cache table.

The foregoing mainly describes, from a perspective of exchange between network elements, the solutions provided in at least one embodiment. To implement the foregoing functions, the foregoing network elements include corresponding hardware structures and/or software modules for performing the functions. A person skilled in the art should easily be aware that, in combination with units and algorithm steps of the examples described in embodiments disclosed in at least one embodiment, at least one embodiment can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but the implementation do not go beyond the scope of embodiments described herein.

In at least one embodiment, the first node, the second node, and the like may be divided into functional modules based on the foregoing method examples. For example, the functional modules may be divided based on functions, or two or more functions may be integrated into one processing module. The integrated module may be implemented in a form of hardware, or may be implemented in a form of a software functional module. In at least one embodiment, module division is an example, and is merely logical function division. During actual implementation, another division manner may be used.

Figure 5:
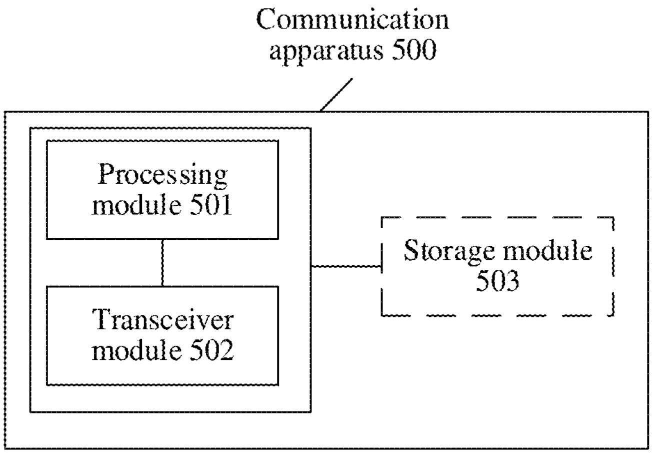
FIG. 5 is a schematic of a structure of a communication apparatus according to at least one embodiment.

In response to an integrated unit being used, refer to FIG. 5. FIG. 5 is a schematic of a structure of a communication apparatus according to at least one embodiment. The communication apparatus 500 may be used in the methods shown in FIG. 3 and FIG. 4. As shown in FIG. 5, the communication apparatus 500 includes a processing module 501 and a transceiver module 502. The processing module 501 may be one or more processors. The transceiver module 502 may be a forwarding unit, and the forwarding unit may be implemented by using an independent chip or a logical software design. The communication apparatus may be configured to implement a function of a first node and a second node in any one of the foregoing method embodiments, or configured to implement a function of a network element in any one of the foregoing method embodiments. The network element or a network function may be a network element in a hardware device, a software function running on dedicated hardware, or a virtualization function instantiated on a platform (for example, a cloud platform). Optionally, the communication apparatus 500 may further include a storage module 503, configured to store program code and data that are of the communication apparatus 500.

In an example, in response to the communication apparatus being used as the first node or a chip used in the first node, and steps performed by the first node according to the foregoing method embodiments are performed, the transceiver module 502 is configured to support communication with the second node and the like. For example, the transceiver module 502 is configured to perform sending and/or receiving actions performed by the first node in FIG. 3 and FIG. 4. Specifically, the transceiver module 502 is configured to support the first node in performing one or more of step 301 and step 404, and/or is configured to perform another process of the technology described in at least one embodiment. The processing module 501 may be configured to support the communication apparatus 500 in performing a processing action in the foregoing method embodiments. For example, the processing module 501 is configured to support performing one or more of step 302 and steps 401 to 403, and/or is configured to perform the processing action described in at least one embodiment.

For example, the transceiver module 502 is configured to receive a first packet from the second node. The first packet includes a source IPv6 address of a data packet, and the source IPv6 address of the data packet is a next-hop address in a routing table or a forwarding table of the first node. The processing module 501 is configured to establish a first neighbor cache entry. A destination IPv6 address included in the first neighbor cache entry is the source IPv6 address of the data packet.

For another example, the processing module 501 is configured to obtain a first IPv6 address corresponding to the first packet. The processing module 501 is further configured to search a first area for a media access control MAC address corresponding to the first IPv6 address. The first area is a neighbor cache table. In response to the MAC address corresponding to the first IPv6 address not being found in the first area, the processing module 501 is further configured to obtain, from a second area based on identification information of a first interface, the MAC address corresponding to the first IPv6 address. The first interface is an outbound interface of the first packet. The outbound interface is an Ethernet main interface or virtual local area network VLAN sub-interface, or the outbound interface is an Eth-trunk main interface or VLAN sub-interface. The second area includes a correspondence between identification information of an interface and a MAC address. The transceiver module 502 is configured to send the first packet based on the MAC address corresponding to the first IPv6 address.

In an example, in response to the communication apparatus being used as the second node or a chip used in the second node, and steps performed by the second node according to the foregoing method embodiments are performed, the transceiver module 502 is configured to support communication with the first node and the like. For example, the transceiver module 502 is configured to perform sending and/or receiving actions performed by the second node in FIG. 3 and FIG. 4. Specifically, the transceiver module 502 is configured to support the second node in performing step 301, and/or is configured to perform another process of the technology described in at least one embodiment. The processing module 501 may be configured to support the communication apparatus 500 in performing the processing action in the method embodiments.

In at least one embodiment, in response to the first node or the second node being the chip, the transceiver module 502 may be the forwarding unit, and the forwarding unit may be implemented by using the independent chip or the logical software design. The forwarding unit is connected to the processor through the bus.

The processing module 501 may be a processor. The processor may execute computer-executable instructions stored in the storage module, to enable the chip to perform the methods according to embodiments in FIG. 3 and FIG. 4.

Further, the processor may include a controller, an arithmetic unit, and a register. For example, the controller is mainly responsible for instruction decoding, and transmitting a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for storing a quantity of register operations, intermediate operation results, and the like that are temporarily stored during instruction execution. In specific implementation, a hardware architecture of the processor may be an application-specific integrated circuit (ASIC) architecture, a microprocessor without interlocked piped stages architecture (MIPS) architecture, an advanced RISC machine (ARM) architecture, a network processor (NP) architecture, or the like. The processor may be a single-core or multi-core processor.

The storage module may be a storage module inside the chip, for example, a register or a cache. Alternatively, the storage module may be a storage module located outside the chip, for example, a read-only memory (ROM), another type of static storage device that can store static information and instructions, or a random access memory (RAM).

Functions corresponding to the processor and the forwarding unit may be achieved by using a hardware design, a software design, or a combination of software and hardware. This is not limited herein.

At least one embodiment further provides a communication apparatus including a processor and a memory. The processor invokes a computer program stored in the memory to implement the embodiments described in FIG. 3 and FIG. 4.

At least one embodiment further provides a computer-readable storage medium. The computer-readable storage medium stores a computer program. In response to the computer program being run, the embodiments described in FIG. 3 and FIG. 4 are implemented.

At least one embodiment further provides a computer program product including instructions. In response to the instructions being executed on a computer, the embodiments described in FIG. 3 and FIG. 4 are performed.

The foregoing units described as separate parts may or may not be physically separate, and parts displayed as units may or may not be physical units, may be located in one position, or may be distributed on a plurality of network units. Some or all of the units may be selected according to actual usage to achieve the objectives of the solutions of at least one embodiment. In addition, network element units in at least one embodiment may be integrated into one processing unit, each of the units may exist alone physically, or two or more units may be integrated into one unit. The integrated unit may be implemented in a form of hardware, or may be implemented in a form of a software network element unit.

In response to the foregoing integrated unit being implemented in the form of a software network element unit and sold or used as an independent product, the integrated unit may be stored in a computer-readable storage medium. Based on such an understanding, the part of the technical solutions of at least one embodiment that essentially makes a contribution or all or some of the technical solutions may be implemented in a form of a software product. The computer software product is stored in a storage medium, and includes several instructions for instructing a computer device (which may be a personal computer, a cloud server, a network device, or the like) to perform all or some of the steps of the methods in at least one embodiment. The foregoing storage medium includes any medium that may store program code, such as a USB flash drive, a removable hard disk, a read-only memory (ROM), a random access memory (RAM), a magnetic disk, or an optical disc. The foregoing descriptions are merely specific implementations of at least one embodiment, but are not intended to limit the protection scope of embodiments described herein. Any modification or replacement readily figured out by a person skilled in the art within the technical scope disclosed in at least one embodiment shall fall within the protection scope of embodiments described herein. Therefore, the protection scope of embodiments described herein shall be subject to the protection scope of the claims.

What is claimed is:

1. A flood attack defense method, wherein the method comprises:

receiving, by a first node, a first packet from a second node, wherein the first packet includes a source internet protocol version 6 (IPv6) address of a data packet, and the source IPv6 address of the data packet is a next-hop address in a routing table or a forwarding table of the first node;

establishing, by the first node, a first neighbor cache table that includes a first neighbor cache entry, wherein a destination IPv6 address included in the first neighbor cache entry is the source IPV6 address of the data packet, wherein the first neighbor cache entry further includes a first MAC address, a first state, and a first aging time, and wherein the first neighbor cache entry further includes a correspondence between the destination IPv6 address and the first MAC address, the first state, and the first aging time; and based on the first MAC address, determining whether the destination IPv6 address is valid or invalid.

2. The flood attack defense method according to claim 1, wherein the establishing, by the first node, the first neighbor cache entry includes:

preferentially overwriting, by the first node, a second neighbor cache entry with the first neighbor cache entry, wherein a destination IPv6 address comprised in the second neighbor cache entry is not the next-hop address in the routing table or the forwarding table of the first node.

3. The flood attack defense method according to claim 2, wherein a first area that is in the first node and that stores a neighbor cache entry is fully occupied, the first area is the first neighbor cache table, the neighbor cache entry in the first area includes a destination IPv6 address, and the second neighbor cache entry is included in the first area; and the preferentially overwriting, by the first node, the second neighbor cache entry with the first neighbor cache entry includes:

changing, by the first node, the second neighbor cache entry to the first neighbor cache entry.

4. The flood attack defense method according to claim 3, wherein the storing the neighbor cache entry in the first area further includes storing the first aging time, wherein the second neighbor cache entry is a neighbor cache entry in which the first aging time is a shortest aging time in the first area.

5. The flood attack defense method according to claim 3, wherein a second area that is in the first node and that stores a neighbor cache entry is fully occupied, the second area is a second neighbor cache table, the neighbor cache entry in the second area includes priority information and a destination IPv6 address, and the second neighbor cache entry is included in the second area; and the preferentially overwriting, by the first node, the second neighbor cache entry with the first neighbor cache entry includes:

changing, by the first node, the second neighbor cache entry to the first neighbor cache entry, wherein the priority information included in the second neighbor cache entry is lower than priority information included in a third neighbor cache entry in the second area, and a destination IPv6 address included in the third neighbor cache entry is the next-hop address in the routing table or the forwarding table of the first node.

6. The flood attack defense method according to claim 5, wherein the storing the second neighbor cache entry in the second area further includes storing a second aging time, wherein the second neighbor cache entry is a neighbor cache entry in which the second aging time is a shortest in the second area.

7. The flood attack defense method according to claim 1, wherein areas in the first node that store a neighbor cache entry include a third area and a fourth area, the third area and the fourth area are neighbor cache tables, a destination IPv6 address comprised in a neighbor cache entry in the third area is the next-hop address in the routing table or the forwarding table of the first node, a destination IPv6 address included in a neighbor cache entry in the fourth area is not the next-hop address in the routing table or the forwarding table of the first node, and the fourth area is fully occupied; and the establishing, by the first node, the neighbor cache entry comprises:

establishing, by the first node, the first neighbor cache entry in the third area.

8. The flood attack defense method according to claim 7, wherein the establishing, by the first node, the first neighbor cache entry in the third area includes:

determining, by the first node, whether a fourth neighbor cache entry exists in the third area, wherein a media access control (MAC) address included in the fourth neighbor cache entry is an invalid value, and a destination IPv6 address included in the fourth neighbor cache entry is the source IPv6 address of the data packet; and in response to the fourth neighbor cache entry existing, changing, by the first node, the fourth neighbor cache entry to the first neighbor cache entry; or in response to the fourth neighbor cache entry not existing, establishing, by the first node, the first neighbor cache entry in the third area.

9. An apparatus, comprising:

a processor; and a non-transitory computer-readable storage medium storing a program to be executed by the processor to:

receive a first packet from a second node, wherein the first packet comprises a source internet protocol version 6 IPv6 address of a data packet, and the source IPV6 address of the data packet is a next-hop address in a routing table or a forwarding table of a first node;

establish a first neighbor cache table that includes a first neighbor cache entry, wherein a destination IPv6 address included in the first neighbor cache entry is the source IPV6 address of the data packet, wherein the first neighbor cache entry further includes a first MAC address, a first state, and a first aging time, and wherein the first neighbor cache entry further includes a correspondence between the destination IPv6 address and the first MAC address, the first state, and the first aging time; and based on the first MAC address, determine whether the destination IPv6 address is valid or invalid.

10. The apparatus according to claim 9, wherein when the first node establishes the first neighbor cache entry, the processor executes the program including instructions to:

preferentially overwrite a second neighbor cache entry with the first neighbor cache entry, wherein a destination IPv6 address included in the second neighbor cache entry is not the next-hop address in the routing table or the forwarding table of the first node.

11. The apparatus according to claim 10, wherein a first area that is in the first node and that stores a neighbor cache entry is fully occupied, the first area is the first neighbor cache table, the neighbor cache entry in the first area comprises a destination IPv6 address, and the second neighbor cache entry is comprised in the first area; and in response to the preferentially overwriting the second neighbor cache entry with the first neighbor cache entry, the processor executes the program including instructions to:

change the second neighbor cache entry to the first neighbor cache entry.

12. The apparatus according to claim 11, wherein the neighbor cache entry in the first area further includes the first aging time, and the second neighbor cache entry is a neighbor cache entry in which the first aging time is a shortest in the first area.

13. The apparatus according to claim 11, wherein a second area that is in the first node and that stores a neighbor cache entry is fully occupied, the second area is a neighbor cache table, the neighbor cache entry in the second area includes priority information and a destination IPv6 address, and the second neighbor cache entry is included in the second area; and in response to the preferentially overwriting the second neighbor cache entry with the first neighbor cache entry, the processor executes the program including instructions to:

change the second neighbor cache entry to the first neighbor cache entry, wherein the priority information included in the second neighbor cache entry is lower than priority information comprised in a third neighbor cache entry in the second area, and a destination IPv6 address included in the third neighbor cache entry is the next-hop address in the routing table or the forwarding table of the first node.

14. The apparatus according to claim 13, wherein the second neighbor cache entry in the second area further includes a second aging time, and the second neighbor cache entry is a neighbor cache entry in which the second aging time is a shortest in the second area.

15. The apparatus according to claim 9, wherein areas in the first node that store a neighbor cache entry include a third area and a fourth area, the third area and the fourth area are neighbor cache tables, a destination IPv6 address comprised in a neighbor cache entry in the third area is the next-hop address in the routing table or the forwarding table of the first node, a destination IPv6 address comprised in a neighbor cache entry in the fourth area is not the next-hop address in the routing table or the forwarding table of the first node, and the fourth area is fully occupied; and in response to the first node establishing the neighbor cache entry, the processor executes the program including instructions to:

establish the first neighbor cache entry in the third area.

16. The apparatus according to claim 15, wherein in response to establishing the first neighbor cache entry in the third area, the processor executes the program including instructions to:

determine whether a fourth neighbor cache entry exists in the third area, wherein a media access control MAC address included in the fourth neighbor cache entry is an invalid value, and a destination IPv6 address included in the fourth neighbor cache entry is the source IPV6 address of the data packet; and in response to the fourth neighbor cache entry existing, change the fourth neighbor cache entry to the first neighbor cache entry; or in response to the fourth neighbor cache entry not existing, establish the first neighbor cache entry in the third area.

* * * * *